July 16, 1946.          A. C. RUGE          2,403,952
                        TORQUEMETER
                    Filed Sept. 2, 1944

INVENTOR
Arthur C. Ruge
BY
ATTORNEY

Patented July 16, 1946

2,403,952

UNITED STATES PATENT OFFICE 2,403,952

TORQUE METER

Arthur C. Ruge, Cambridge, Mass., assignor to The Baldwin Locomotive Works, a corporation of Pennsylvania Application September 2, 1944, Serial No. 552,526

3 Claims. (Cl. 73—136)

This invention relates generally to torquemeters and more particularly to a torquemeter of the type employing strain responsive means as a function of torque.

It is an object of my invention to provide a relatively simple, compact and yet highly sensitive and accurate torquemeter adapted to employ strain responsive means as an integral part of a rotating member that is used as a driving or driven device such as a pulley, gear or other element.

A great many different types of torquemeters have been proposed but the same have not had the desired simplicity and economical construction that is essential for certain particular torquemeter applications. My present arrangement provides the necessary simplicity and economy of construction combined with ruggedness and sensitivity whereby it may be readily adapted to many torquemeter situations.

Figure 1:
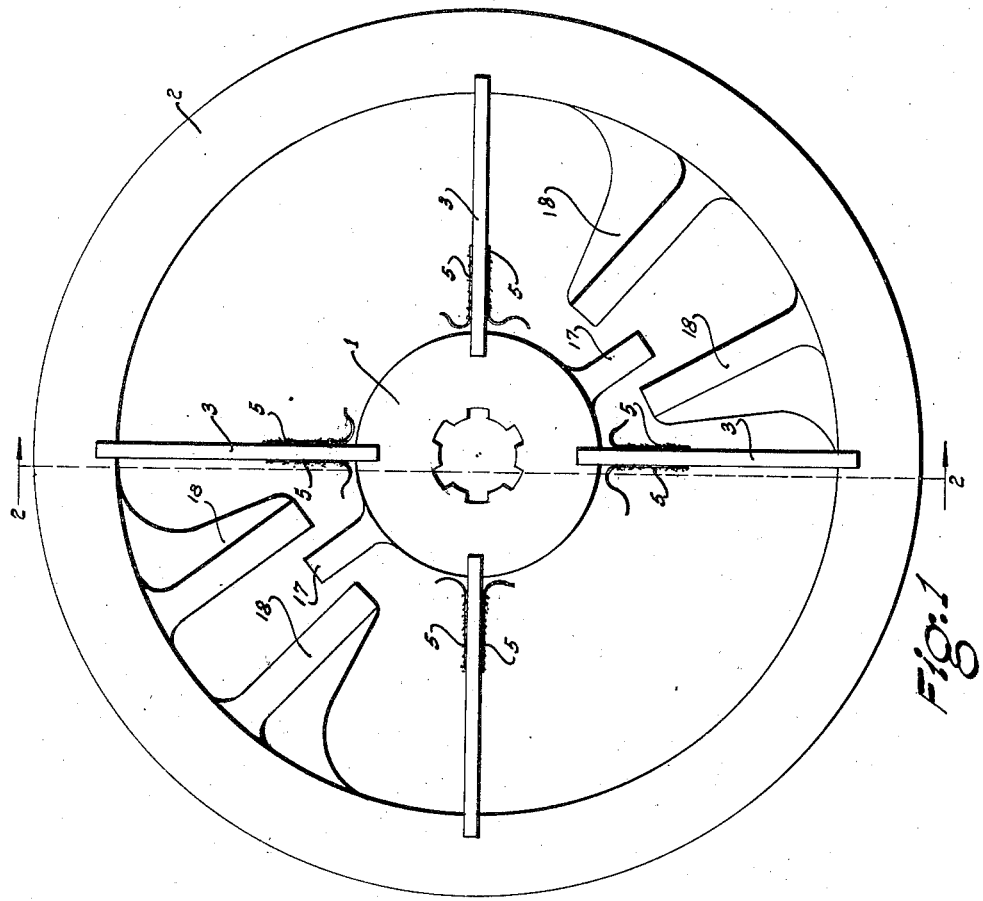
Figure 2:
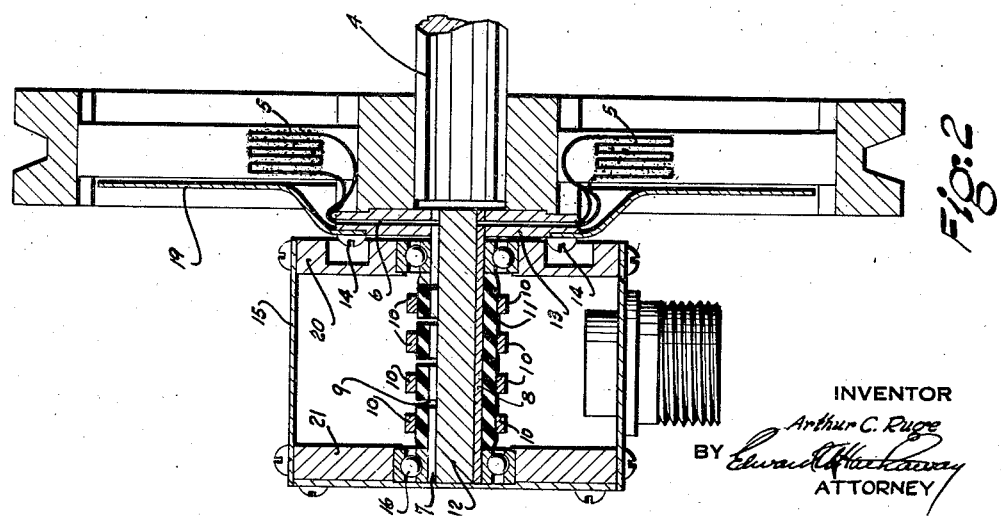

Other objects and advantages will be more apparent to those skilled in the art from the following description of the accompanying drawing in which:

Fig. 1 is a side elevation of my improved torquemeter with certain parts omitted; and Fig. 2 is a transverse section taken substantially on the line 2—2 of Fig. 1.

In the particular embodiment of the invention disclosed herein, the torquemeter is in the form of a spoked wheel having relative angularly movable portions such as a hub 1 and rim 2 connected by flexible spokes 3 which may be embedded or otherwise suitably anchored, as by welding if desired, to the hub and rim. The rim 2 is specifically shown in the form of a grooved pulley, although well-known forms of transmitting means, such as gears or the like, may be employed. Similarly, the hub 1 is shown as adapted to receive a splined shaft 4 although, again, other well-known forms of load transmitting means may be used in place of the specific form shown. The spokes 3 are shown as four in number, although any necessary number or size of spokes may be employed to carry any particular load so long as they have sufficient flexibility to permit sensitive determination of the torque transmitted from the hub to the rim or vice versa.

To determine torque in accordance with the bending strains in the torque spokes 3 I employ any suitable electrical impedance means mounted on the spokes so as to be responsive to the strains therein. One preferable type of strain impedance means is the well-known bonded wire resistance strain gage 5 cemented to the spokes in a manner well-known in the art. The gage wire preferably extends lengthwise of the spokes and may be located on opposite sides thereof to obtain maximum sensitivity by placing the gages in the proper arms of a Wheatstone bridge to produce a cumulative strain effect. The spokes are preferably flat and thin together with being relatively wide in an axial direction so as to insure not only maximum lateral stability or rigidity between the hub and rim but also to provide an effective strain responsive surface to which a relatively flat strain gage may be cemented. The lead wires from each gage may be connected through suitable radial openings 6, Fig. 2, extending through an end plate 13 and then along an axial slot 7 in a shaft sleeve 8. Radial openings 9 permit the wires to extend out for connection to slip rings 10. The slip rings and an insulation sleeve 11 are all mounted upon a slip ring shaft 12 which is formed preferably as a part of the end plate 13, said elements constituting a slip ring structure secured by screws 14 to the hub. To support usual and well-known brushes (not shown) for the slip rings 10 a housing 15 may be journalled through suitable ball bearings 16 upon the ring shaft 12 and the brushes suitably supported in this housing which remains stationary during rotation of the torquemeter.

To prevent overloading the torquemeter and also to provide a safety means in the event of failure of one or more of the flexible spokes I provide suitable stops 17 and 18 on the hub and rim, these stops being in circumferential alignment with each other but normally spaced apart a safe suitable distance to allow bending of the spokes 3 through the full designed capacity of torquemeter.

In order to protect the gages as well as to shield the safety elements 17 and 18, I have provided a sheet metal disc 19 extending between the inner circumference of rim 2 and hub 1. This disc is formed as part of the slip ring structure by being held thereto and to the hub 1 by screws 14. Access to the screws 14 may be had by simply removing the annular cover of housing 15 and then shifting the end member 20 off of its ball bearing inwardly toward the other end plate 21.

From the foregoing disclosure it is seen that I have provided an extremely simple, compact and rugged torquemeter that has a high degree of accuracy, sensitivity and responsiveness combined with safety, durability and functional stability. My improved torquemeter is especially compact in an axial direction which is of particular importance on small diameter shafts.

It will of course be understood that various changes in details of construction and arrangement of parts may be made by those skilled in the art without departing from the spirit of the invention as set forth in the appended claims.

I claim:

1. A torquemeter comprising hub and rim members, flexible spokes connecting said members together to allow relative angular movement between said hub and rim members in accordance with the torque transmitted between the same, and strain responsive means secured to said flexible spokes so as to be responsive to surface strain induced therein by torque transmitted therethrough.

2. The combination set forth in claim 1 further characterized in that the spokes are flat and relatively wide to provide transverse stability between the hub and rim members and are of such thickness as to be flexible in a direction to permit the relative angular movement between the hub and rim members.

3. The combination set forth in claim 1 further characterized in that the strain responsive means comprises resistance wire gages bonded to the spokes so as to be responsive to the bending strains therein upon relative angular movement between the hub and rim members.

ARTHUR C. RUGE.